(12) United States Patent
White et al.

(10) Patent No.: US 7,937,674 B2
(45) Date of Patent: May 3, 2011

(54) METHOD, SYSTEM, AND COMPUTER PROGRAM PRODUCT FOR PREDICTING THIN FILM INTEGRITY, MANUFACTURABILITY, RELIABILITY, AND PERFORMANCE IN ELECTRONIC DESIGNS

(75) Inventors: David White, San Jose, CA (US); Louis K. Scheffer, Campbell, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 183 days.

(21) Appl. No.: 11/866,386

(22) Filed: Oct. 2, 2007

(65) Prior Publication Data

US 2008/0160646 A1 Jul. 3, 2008

Related U.S. Application Data

(60) Provisional application No. 60/878,005, filed on Dec. 29, 2006.

(51) Int. Cl.
*G06F 17/50* (2006.01)
(52) U.S. Cl. ............................................. 716/51; 716/52
(58) Field of Classification Search .................. 716/2, 4, 716/5, 7, 19–21, 51, 52, 112, 136
See application file for complete search history.

(56) References Cited

U.S. PATENT DOCUMENTS

| | | | |
|---|---|---|---|
| 7,124,386 B2 | 10/2006 | Smith et al. | |
| 7,152,215 B2 | 12/2006 | Smith et al. | |
| 7,174,520 B2 | 2/2007 | White et al. | |
| 7,243,316 B2 | 7/2007 | White et al. | |
| 7,325,206 B2 | 1/2008 | White et al. | |
| 7,353,475 B2 | 4/2008 | White et al. | |
| 7,356,783 B2 | 4/2008 | Smith et al. | |
| 7,360,179 B2 | 4/2008 | Smith et al. | |
| 7,363,099 B2 | 4/2008 | Smith et al. | |
| 7,363,598 B2 | 4/2008 | Smith et al. | |
| 7,367,008 B2 | 4/2008 | White et al. | |
| 7,380,220 B2 | 5/2008 | Smith et al. | |
| 7,383,521 B2 | 6/2008 | Smith et al. | |
| 7,393,755 B2 | 7/2008 | Smith et al. | |
| 2004/0210423 A1* | 10/2004 | Ashida et al. | 702/189 |
| 2005/0037522 A1 | 2/2005 | Smith et al. | |
| 2005/0051809 A1 | 3/2005 | Smith et al. | |
| 2005/0076316 A1* | 4/2005 | Pierrat et al. | 716/4 |
| 2005/0132306 A1 | 6/2005 | Smith et al. | |
| 2005/0196964 A1 | 9/2005 | Smith et al. | |
| 2005/0235246 A1 | 10/2005 | Smith et al. | |
| 2007/0101305 A1 | 5/2007 | Smith et al. | |
| 2007/0256039 A1 | 11/2007 | White | |
| 2008/0027698 A1 | 1/2008 | White | |
| 2008/0160646 A1 | 7/2008 | White et al. | |
| 2008/0162103 A1 | 7/2008 | White et al. | |

(Continued)

*Primary Examiner* — Vuthe Siek
(74) *Attorney, Agent, or Firm* — Vista IP Law Group LLP

(57) ABSTRACT

Disclosed is an improved method, system, and computer program product for predicting and improving the integrity, manufacturability, reliability, and performance of an electronic circuit feature based on the stresses or strains of design features of electronic designs. Some embodiments identify the design, the concurrent model(s), design feature physical or electrical parameters or attributes, analyzes the stresses or strains to predict the integrity of the design and determines whether the design meets the design objectives or constraints. Some other embodiments make corrections to the designs or the processes based upon the determination of whether the design meets the design objectives or constraints. Some other embodiments compute the variations of the design features as a result of the stresses or strains and determine their impact on the subsequent processes.

31 Claims, 9 Drawing Sheets

U.S. PATENT DOCUMENTS

| | | |
|---|---|---|
| 2008/0163139 A1 | 7/2008 | Scheffer et al. |
| 2008/0163141 A1 | 7/2008 | Scheffer et al. |
| 2008/0163142 A1 | 7/2008 | White et al. |
| 2008/0163148 A1 | 7/2008 | Scheffer et al. |
| 2008/0163150 A1 | 7/2008 | White et al. |
| 2008/0216027 A1 | 9/2008 | White et al. |
| 2009/0031261 A1 | 1/2009 | Smith et al. |
| 2009/0031271 A1 | 1/2009 | White et al. |

* cited by examiner

METHOD, SYSTEM, AND COMPUTER PROGRAM PRODUCT FOR PREDICTING THIN FILM INTEGRITY, MANUFACTURABILITY, RELIABILITY, AND PERFORMANCE IN ELECTRONIC DESIGNS

CROSS-REFERENCE TO RELATED APPLICATION(S)

This application claims the benefit of U.S. Provisional Application No. 60/878,005, filed on Dec. 29, 2006, which is hereby incorporated by reference in its entirety.

BACKGROUND OF THE INVENTION

Stresses and strains within a feature of an integrated circuit (IC) or an electronic circuit design may cause many undesired adverse effects or even cause the design to fail. Among the many adverse effects, manufacturability, reliability, and performance are of primary concern. For example, the electric stress in the gate oxide caused by the electric field across the oxide has been shown to increase as the voltage drop across the oxide increases; the stress also increases as the temperature rises due to Joule heating which may be further exacerbated due to the introduction of low-k dielectrics because of its higher porosity. The voltage overshoot during device switching further worsens the problem and increases the likelihood of gate oxide premature failure. Moreover, stress induced degradation in electrical parameters may also lead to timing conflicts in digital circuits and mismatch in analog applications, and such stresses may also cause noise due to the accelerated dielectric deterioration and eventual breakdown.

In the deep-submicron technologies, the continual push for increased carrier mobility and decreased resistance and capacitance demands thinner gate oxides (especially for high performance ICs) and thinner silicon (Si) film thickness further exacerbates the problem. Deep-submicron technologies often employ thin gate oxides in order to reduce capacitance and thus to improve timing. For example, at 65 nm technology nodes, the nominal gate oxide thickness is about 1.2 nm. On the other hand, thinner gate oxide layer increases the oxide tunneling leakage current. It has been shown that the oxide tunneling leakage current increases roughly two and half times for every 0.1 nm reduction in oxide thickness. Current semiconductor fabrication techniques use nitrided oxide to reduce leakage by an order of magnitude. However, the oxide tunneling leakage current has been shown to be as great as 100 $A/cm^2$ for 1.0 nm thick nitrided oxides or even 1000 $A/cm^2$ without nitridation while the design criterion is usually no higher than 1.0 $A/cm^2$. This leakage current poses a great challenge to controlling the thickness of the gate oxide as well as the design.

Moreover, thinner silicon films have shown to improve performance by reducing junction capacitance, but such films also cause the body resistance to degrade and worsens Joule heating and thus may render the design feature less effective or even useless.

In the area of routing, one of the crucial factors is the total number of vias connecting various metal layers, the line lengths and widths, and the overlap of metal lines around the vias. It is known that the cathode vias usually exhibit tensile stresses and the anode vias usually compressive. The tensile stresses may cause stress-induced void nucleation and growth and therefore increase resistance and thus Joule heating which further worsens the electro-migration due to higher metal-ion diffusion and the stress state of the vias. Moreover, whether the feature is subject to DC, pulse-DC, or AC and the direction of the current flow are among the more important criteria in via placement. As such, one of the design goals is to avoid having a single via carry high DC current, particularly in the downstream direction (current flow from the upper metal layer to the lower metal layer.) Furthermore, the mechanical stress caused by thermal expansion mismatch among different materials within the stack or by other processing steps can also cause reliability or manufacturability problems in the vias. One method to address this via placement is to add redundant vias. This method may provide somewhat satisfactory solutions for current technologies, but it fails to address the root cause of the problem which is the tensile stress within the features.

Furthermore, certain processing techniques and materials may contribute to the in-film stresses due to the intrinsic material properties, individual process characteristics, and/or inherent process variations. For example, various plasma enhanced deposition processes may cause electric stresses (plasma-induced damage) that may consume the life of the gate oxides or cause drifts in the MOSFET parameters. Also, certain deposited films, such as tantalum nitride, exhibit tensile stress during and after fabrication while tantalum films exhibit compressive stresses. Moreover, for copper damascene processes, it has been shown that the time between chemical-mechanical polishing (CMP) and dielectric deposition on copper also adversely affects the dielectric strength of the material. The development of chemical-mechanical polishing (CMP) has become important for multilevel interconnection because it is the only technology that allows global planarization. In chemical-mechanical polishing, it has been shown that the flow stress of the copper film increases with the copper film thickness after the CMP planarization process.

On the other hand, the film stress state also affects fabrication processes. For example, results from oxide CMP experiments suggest that the wafer curvature results in a non-uniform polish rate distribution across the wafer. This stress-dependent polish non-uniformity is attributed to the non-uniform pressure distribution across the wafer, induced by the wafer radius of curvature which results from film stresses. Furthermore, it was found that the magnitude of oxide film stress itself has little effect on removal rate. Oxides with tensile stress tend to have a weakened bond structure and enhanced chemical reactivity, both of which result in slightly higher removal rates. The reverse is also true for oxides with compressive stress. Deviations from the model prediction may result from the stress induced by slurry flow, local variations in wafer shape and form, and pad surface properties.

Conventional approaches in stress or strain analysis measure the distances from the both trench isolation edges to poly-Silicon and then use this measurement to estimate the effects of stress. This may be done in two ways. One conventional approach picks the SPICE model based on the distance of the poly from the edge of the active area. The other approach allows extract to find the distance from the trench isolation edge and then adds this distance as a parameter to the SPICE model, which then estimates the effect on the transistor. However, these conventional approaches merely approximate the expected stresses but not the actual stresses. Furthermore, conventional approaches also do not take into consideration other sources of stresses such as other layers or neighboring devices.

SUMMARY OF THE INVENTION

As such, a need exists for a method and a system for evaluating the stress among various layers of an IC design with the aid of the actual layout and the process models to predict whether the electronic designs meet certain design criteria.

The present invention is directed to an improved method, system, and computer program product for evaluating the stress among various layers of an integrated circuit with the aid of the actual layout and the process models to predict whether the electronic designs meet certain design criteria. Some embodiments utilize the above method, system, and/or computer program to evaluating stresses within various layers of an integrated circuit with the aid of the actual layout and the process models to compute the non-planarity of the films. As noted above, conventional methods and systems provide patchy solutions without addressing the root causes of the problem.

DESCRIPTION OF FIGURES

The drawings illustrate the design and utility of several embodiments of the present invention. It should be noted that the figures are not drawn to scale and that elements of similar structures or functions are represented by like reference numerals throughout the figures. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention is directed to an improved method, system, and computer program product for evaluating the stresses or strains within various layers or parts of an integrated circuit or an electronic circuit with the aid of the one or more concurrent models for the manufacturing of the electronic circuit or the design layout to predict whether the electronic designs meet certain design criteria. Some embodiments utilize the above method, system, and/or computer program to evaluating stresses within various layers of an integrated circuit with the aid of the design layout and the one or more concurrent models for the manufacturing processes or techniques to compute the non-planarity of the films. As noted above, conventional methods and systems provide patchy solutions without addressing the root causes of the problem.

Figure 1:
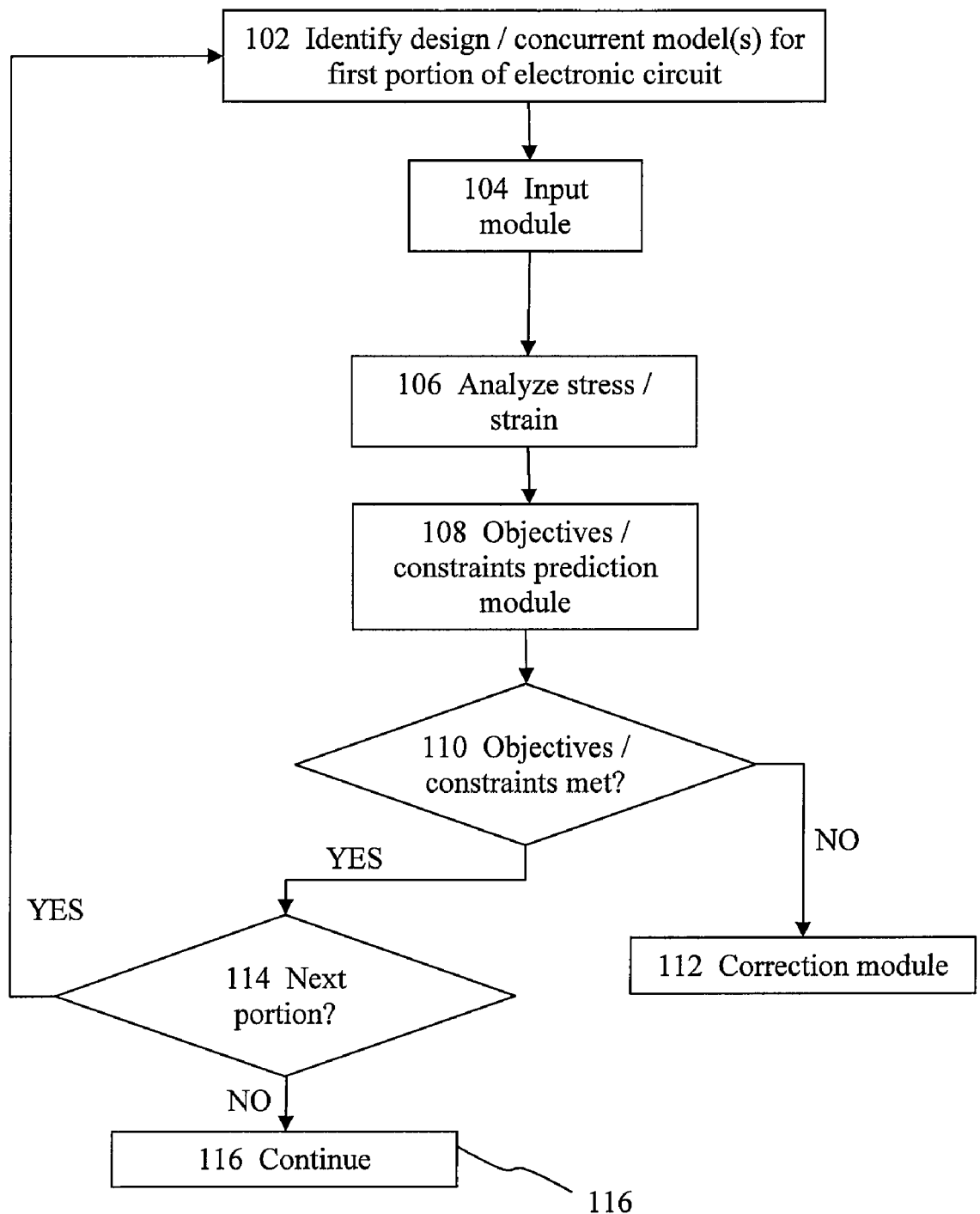
FIG. 1 illustrates a general flow of the method for predicting thin film integrity due to in-film stresses and strains.

Referring to FIG. 1, the method or the system of several embodiments of the invention first identifies a first portion of the integrated circuit (IC) design or the electronic circuit design at the first level at 102. The first portion may comprise, for example but shall not be limited to, an interconnect level, a metal layer of the electronic circuit design, a mask level, or a feature, a component, a region, a module, or a sub-circuitry of the electronic circuit design. At 104, the method or the system of some embodiments of the present invention then invokes the input module which further collects information and data of the design.

Some other embodiments may be applied where only a portion of the final complete layout, for example one or more blocks or cells, is available. A context simulation method may be used to introduce likely geometric environments into the incomplete regions, for example structures with similar densities or line widths, or an environment with a geometric distribution based on prior designs. For processes with large pattern interaction ranges such as CMP, simulation of layout portions not available may be useful. More details about context simulation is described in U.S. patent application Ser. No. 11/768,851, entitled "METHOD AND SYSTEM FOR IMPLEMENTING CONTEXT SIMULATION" filed on Jun. 26, 2007 which is incorporated herein by reference in its entirety.

Figure 2:
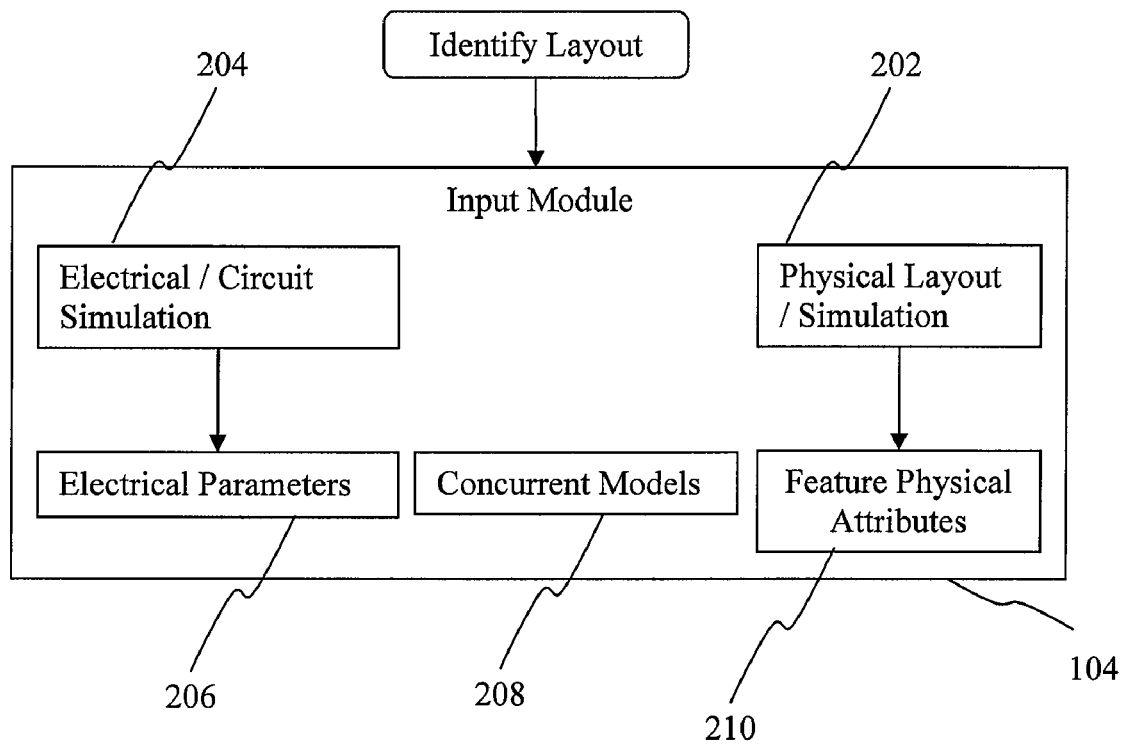
FIG. 2 illustrates an example of the input module in the method for predicting thin film integrity due to in-film stresses and strains.

FIG. 2 further illustrates several embodiments of the input module 104 which may comprise physical attributes 210, of one or more design features from the physical layout 202, concurrent models for processes or techniques involved in the manufacturing of the electronic circuit 208, and/or electrical parameters 206 from electrical simulation 204, or the analysis results of the concurrent models and layouts.

The physical parameter 210 may comprise, for example but shall not be limited to, wire length, width, cross-section profile, and/or thickness, film thickness, spacing of electronic circuit design features, depth of the electronic design features, or other geometrical attributes of the electronic circuit design features. The physical parameter 210 may also comprise, for example but shall not be limited to, other physical characteristics of the electronic circuit design features such as the composition of the materials, the concentration of species in one material, the distribution of species within a material (e.g., the distribution of dopants and penetration depth in an implantation process). The physical parameter 210 may further comprise physical characteristics of the electronic circuit design features such as the thermal characteristics of the material of the electronic circuit design feature. Such thermal characteristics may comprise, for example, but shall not be limited to, thermal expansion coefficient, thermal conductivity, temperature distribution, convectivity of various species in the processing environment, or specific heat capacity. In some embodiments of the invention, the information or data obtained by the input module may also comprise one or more operational characteristic of the electronic circuit. Such one or more operational characteristics of the electronic circuit may comprise, for example but shall not be limited to, the clock frequencies, operational voltages, power distribution or variation, methods and materials of device packaging, heat transfer mechanisms of the electronic circuit during operation, etc.

The concurrent model for a process 208 may comprise, for example, one or more concurrent models for one or more fabrication, metrology, or image processing processes or techniques involved in the manufacturing of the electronic circuits. The electrical parameters 206 may comprise, for example but shall not be limited to, bulk or specific electrical resistance, capacitance, IR drop, RC time constant, dielectric strength, electrical conductivity, electron or hole mobility, diffusivity, carrier concentration, electromagnetic field, and/or timing delay information.

Although some of the electrical and physical parameters may be obtained directly from sources such as material handbook, the electrical and physical parameters may be more accurately represented in various embodiments of the present invention by analyzing the electronic circuit design in conjunction with the one or more concurrent models. For example, in order to obtain the specific electrical resistance (or resistivity) of a conductor may be calculated with the formula $$\rho = R\frac{A}{l}$$

by looking up the corresponding resistance value (R) of a uniform specimen of the same material of which the particular material of the conductor is made while assuming the cross-sectional area (A) of the conductor along its entire length.

In some embodiments of the present invention, the same specific electrical resistance (or resistivity) may also be obtained by the same formula by looking up the corresponding resistance value (R) of a uniform specimen of the same material of which the particular material of the conductor is made while the one or more concurrent models for the manufacturing of the conductor may more accurately determine the cross-section of the conductor along its length and thus even though in these embodiments the method or the system still refers to the resistance of a uniform specimen of the material from published results such as materials handbooks, the specific electrical resistance is more accurately represented as the manufactured conductor usually deviates from its intended rectangular cross-section and actually exhibits various trapezoidal shapes along the length of the conductor which will be more precisely represented in various embodiments of the present invention through the use of one or more concurrent models.

Take capacitance of a dielectric feature as another example. Capacitance is commonly represented by the formula of $$C = k\varepsilon_0 \frac{A}{d},$$

where C denotes the capacitance, $\varepsilon_0$ denotes the permittivity of vacuum, A is the area of the dielectric feature storing charges, k denotes the dielectric constant of the dielectric feature, and d denotes the thickness of the dielectric feature. Conventionally, the capacitance may be determined by referring to the dielectric constant and permittivity of vacuum from sources such as science handbooks and assuming the dielectric feature is to be manufactured exactly as it is designed. This conventional approach has been, however, proven to be inadequate for modern high performance logic or memory devices where, for example, the gate oxide may be only slightly over 1 nm thick and even a slight variation of 0.1 nm, which would be deemed adequate for some less demanding memory devices or older logic devices, may cause sufficient deviation from the specification to erroneously outlaw a perfectly function device or to erroneous report a device being adequate while it is actually not.

In some embodiments of the present invention, the method or the system may analyze the electronic circuit design, with the aid of one or more concurrent models for the manufacturing of such electronic circuit design features to correctly analyze the geometric characteristics of such electronic circuit design features and more accurately determine whether the electronic circuit design features which are to be manufactured by the current manufacturing processes meets the performance requirement. In some other embodiments, the method or the system may even analyze such electronic circuit design features based upon the concurrent models for manufacturing processes and the stress or strain models to estimate or predict the reliability or life of the features. For example, the method or the system of some embodiments of the invention may determine the likelihood of partial discharge or dielectric breakdown of a dielectric feature based upon the one or more concurrent models for the manufacturing of the dielectric feature, the stress/strain models, or a failure model for the dielectric feature. The failure model for the dielectric feature comprises a fracture models, or other models such as an empirical model or data correlating properties of a dielectric material and defects in the dielectric material.

In some embodiments of the present invention, a concurrent model for a process 208 may be constructed based purely upon direct simulation of the underlying principles of physics with the aid of various mathematical methods for the process or technique which the concurrent model precisely describes. In some other embodiments, the method or the system may directly simulate the underlying physics principles in conjunction with the characteristics of the specific processing tool. For example, the method or the system of some embodiments of the present invention may model the underlying physics of a deposition process in conjunction with one or more parameters specific to a processing chamber. Such one or more parameters may comprise, for example but shall not be limited to, power distribution (DC, pulse DC, AC, or RF), rate and manner of distribution of process chemistries, processing cell geometric characteristics such as the dark space configuration, target to substrate spacing, or the substrate contact mechanism, bias distribution, magnetron configuration and operation characteristics, processing time, vacuum level, etc. In this manner, the method or the system of various embodiments of the present invention may better approximate the expected or predicted results so as to better fit the actual electronic circuit to be manufactured by the specific type of processing tool.

In other embodiments, a concurrent model may first be built upon some physics principles with the aid of mathematical methods to approximate the process or technique the concurrent is to describe. Such an approximate concurrent model may be further fine tuned with data or information obtained from sources such as one or more patterned test wafers or other sources of limited fidelity such as a simple analytic model, empirical formulae or models, formulae or models with interpolation or extrapolation of information or data, or other approximations. That is, a concurrent model may be constructed by some, for example, simplified physics principles with the aid of mathematical methods or some empirical formulae and may then be further fine tuned or calibrated by data or information obtained from one or more patterned test wafers or from other sources of limited fidelity such as a simple analytic model, empirical formulae or models, formulae or models with interpolation or extrapolation of information or data, or other approximations. Similarly, the method or the system of some embodiments of the present invention may also construct the one or more concurrent models further with the aid of the characteristics of the specific processing tool to better approximate the expected or predicted results so as to better fit the actual electronic circuit to be manufactured by the specific type of processing tool.

In some other embodiments, a concurrent model may be constructed purely upon data or information obtained or obtained from one or more patterned test wafers or from other sources of limited fidelity such as a simple analytic model, empirical formulae or models, formulae or models with interpolation or extrapolation of information or data, or other approximations. For part or all of a given layer of an electronic circuit design or even the entire electronic circuit design, there may exist concurrent models built by some or all the aforementioned methods. There may exist concurrent models constructed by more than one of the aforementioned method even for the same process or technique which the concurrent models are constructed to describe. For example, where greater accuracy is desired or where the performance is critical in a sub-circuit, the concurrent model may be built upon physics principles and/or mathematical methods with or without the aid of data or information obtained from patterned test wafers or from other sources of limited fidelity such as a simple analytic model, empirical formulae or models, formulae or models with interpolation or extrapolation of information or data, or other approximations. As another example, where the performance is not critical in certain part of the electronic circuit or where reducing cost is of greater concern for certain part of a layer of the electronic circuit design or certain part of the electronic circuit itself, a concurrent model may be built purely upon information or data obtained from patterned test wafers, other less accurate but easier or less expensive models with limited fidelity such as a simple analytic model, empirical formulae or models, formulae or models with interpolation or extrapolation of information or data, or other approximations.

The concurrent models may be constructed to incorporate one or more processes or techniques involved in the manufacturing of the electronic circuit. The one or more processes or techniques utilized in these methods or systems comprise models for fabrication processes or techniques, metrology processes or techniques, or image processing techniques.

Moreover, the fabrication process or technique may comprise, for example but shall not be limited to, a deposition process, a removal process, a patterning process, or a property modification process or technique.

More particularly, the deposition processes or techniques upon which the one or more concurrent models are built may comprise, for example but shall not be limited to, physical vapor deposition (PVD), chemical vapor deposition (CVD), atomic layer deposition (ALD), electrochemical deposition or electro-plating (ECD), electroless plating or deposition, auto-catalytic plating or deposition, and molecular beam epitaxy (MBE). The removal processes may comprise, for example but shall not be limited to, isotropic or anisotropic wet or dry etching, chemical mechanical polishing (CMP), or reflow processes.

The removal process or technique may comprise, for example but shall not be limited to, isotropic or anisotropic wet or dry etching, chemical mechanical polishing (CMP), dry cleaning processes such as an UV—$Cl_2$ or UV—$O_3$ cleaning process, or a reflow processes.

The patterning processes may comprise, for example but shall not be limited to, lithography processes or techniques such as lithography processes or techniques comprise microlithography, nanolithography, photolithography, electron beam lithography, maskless lithography, nanoimprint lithography, interference lithography, x-ray lithography, extreme ultraviolet lithography, or scanning probe lithography, or the plasma ashing processes.

The property modification processes or techniques may comprise, for example but shall not be limited to, ion implantation, annealing, oxidation, UVP (ultraviolet light processing).

The metrology process or technique may comprise, for example but shall not be limited to, transmission electron microscopy (TEM), scanning electron microscopy (SEM), transmission electron aberration-corrected microscopy, energy filtered TEM, optical measurement techniques, Raman scattering, infrared spectroscopy, x-ray diffraction, optical absorption, photoluminescence, or electrical measurement techniques.

The imaging processing techniques or processes may comprise, for example but shall not be limited to, various resolution enhancement techniques such as ruled-based or model-based Optical Proximity Correction (OPC), Subresolution Assist Features (SRAF), Phase Shifting-Mask (PSM), and Off-Axis Illumination (OAI).

Referring back to FIG. 1, the method or the system of some embodiments of the present invention then proceeds to 106 to analyze the stresses and/or strains within one or more of the electronic circuit design features based upon the information and/or data from the input module and the design. In some embodiments of the present invention, the method or the system analyzes or determines the actual stresses or strains of the features in question. More particularly, in some embodiments, the method or the system may determine the geometric characteristics of the electronic circuit design features based upon the input from the input module. Based upon the geometric characteristics of the electronic circuit design features, the method or the system of some embodiments of the present invention may further determine the stress in the electronic circuit design features. For example, the method or the system of some embodiments of the present invention may analyze the electronic circuit design features based upon a steady-state or transient analysis incorporating the thermal characteristics of the electronic circuit design feature to determine the stresses or strains in these electronic circuit design features. Such thermal characteristics may be determined by the conduction, convection, or radiation mechanisms due to processing or manufacturing of the electronic circuit design features. Such thermal characteristics may comprise, for example but shall not be limited to, temperature distribution across the substrate or temperature variations before, at, or after each processing or manufacturing of these features or thermal expansion mismatch among different materials in contact with each other. The method or the system of some embodiments of the present invention may also determine the state of the stresses (e.g., compressive or tensile) and the magnitude of the stresses or strains.

It shall be noted that each of the one or more electronic circuit design feature may comprise a single layer of film, a stack of films, or a component of the electronic circuit, Where the electronic circuit design feature comprises more than one single film, the method or the system of some embodiments of the invention analyzes the stress or strain within each film by further taking, for example, the physical, thermal, or electrical characteristics of the other layers of films into consideration. Some embodiments may determine a single value for the stress or strain within an individual film; while some other embodiments may determine a distribution of stress or strain within an individual film; while some other embodiments may determine a combination of individual values and distribution in different regions of the feature. Whether the analysis yields a single value, a distribution, or a combination thereof is to be determined based upon, for example, the fidelity required or other criteria such as cost. It shall also be noted that in some embodiments, the method or the system may take into consideration the neighboring components or devices surrounding the device or component in question to analyze the stress or strain in the component. Whether and how far the analysis should consider in analyzing the stress or strain of a particular feature is to determined by, for example, the type of stress to be analyzed or the fidelity desired.

The stresses may comprise, for example but shall not be limited to, electric stresses, mechanical stresses, and strain induced stresses.

Electric stresses may arise out of the electric field across a dielectric material. Such electric fields may be caused by the plasma of the fabrication processes, the working voltage applied to the IC, or voltage overshoot during switching. Electric stresses may further comprise stresses arising out of carrier transport as a result of the current flow or electromigration. Moreover, the effect of electric stresses may increase as the temperature rises.

Mechanical stresses may be caused by, for example but are not limited to, mismatch of thermal expansion coefficients of different materials, different processing conditions such as temperature, plasma densities, different bias potentials on substrates, or other mechanical, chemical, or electrical means for processing. Mechanical stresses may further arise as an intrinsic property of the film material. For example, PVD Titanium, Titanium Nitride, or Tantalum exhibit compressive stress state as deposited, but PVD Tantalum Nitride exhibit, however, tensile stress state. Strain-induced stresses comprise, for example but are not limited to, stresses due to change of substrate/film geometries as a result of the fabrication process. An example of such strain-induced stresses may be found in strained Silicon surface channel CMOS which is commonly used to improve carrier mobility and Ion for gates.

In some other embodiments of the invention, the method or the system may further incorporate the operational parameters of the electronic circuit to determine the stresses or strains caused by, for example but shall not be limited to, Joule heating or switching activities of the electronic circuit design features. For example, based upon the geometric characteristics of the electronic circuit design features such as the cross-sectional profile of a conductor or the thickness of a silicon feature, the method or the system of some embodiments of the invention may more accurately determine the resistance of an electronic circuit design feature and may further incorporate such electrical resistance to determine how much heat is generated in the electronic circuit due to Joule heating during operation of the electronic circuit. In these embodiments, the method or the system may then incorporate such heat generated by Joule heating in the analysis to further determine the stresses or strains induced by the Joule heating. The method or the system in some other embodiments of the present invention may also determining voltage overshoot during device switching and use that voltage overshoot in further analyses of the degradation, deterioration, or life of electronic circuit design features which is described in further details below.

The method or the system of some embodiments of the invention may also analyze the degradation or deterioration in the properties or the life of the electronic circuit design features based upon the amount and state of stresses and strains so determined. For example, the method or the system of some embodiments of the invention may further incorporate a fracture model to analyze the void or crack nucleation or crack growth to predict degradation, deterioration, failure, breakdown, or life of the electronic circuit design or its individual features such as some dielectric features. The method or the system of some other embodiments of the present invention may also determine the impact of such electronic circuit design feature degradation or deterioration on the performance of the electronic circuit based upon the analyses of electronic circuit design feature degradation or deterioration. In one embodiment of the present invention, the method or the system may analyze timing conflicts in digital applications. The method or the system in another embodiment of the present invention may analyze the mismatch problem in analog applications based upon the analyses of electronic circuit design feature degradation or deterioration. In another embodiment of the present invention, the method or the system may perform noise analysis caused by the degradation or deterioration of the electronic circuit design features. In another embodiment of the present invention, the method or the system may estimate or predict the life of the electronic circuit design feature based upon the degradation or deterioration of the electronic circuit design feature.

In some embodiments of the present invention, the method or the system may, based upon the stress and strain analysis, further determine the impact of the stresses and strains on subsequent fabrication processes. In some embodiments of the invention, the method or the system may determine the geometric characteristics such as the curvature of the substrate in a stressed state and analyze the impact of such stresses or strains on subsequent fabrication processes. For example, the method or the system of some embodiments of the present invention may determine the curvature of the wafer due to stresses or strains induced by previous fabrication processes and analyze the impact of such stresses or strains on subsequent planarization processes such as CMP. Such impact may comprise different removal rate at different locations on the substrate. In some other embodiments, the method or the system may further analyze the impact of such stresses or strains on subsequent processes by incorporating one or more concurrent models for the subsequent processes. For example, the method or the system of some embodiments of the present invention may incorporate a concurrent model for the subsequent CMP process to analyze the material removal rates in different regions of the wafer or of different materials on the wafer or flatness of a film after the CMP process on a bowed wafer due to the stresses or strains induced by previous fabrication processes. The concurrent model of CMP may also generate pressure maps throughout the process time window to reflect the strong local pressures that may build in certain areas due to local pattern density or some pattern related feature or set of features. For example, areas such as corner where a memory block ends and solid dielectric material surrounds it may benefit from stress analysis. The contrast between materials may create an area of high pressure that may relate to stress impacts. A concurrent model of CMP may be able to produce a pressure map from the layout of each metal level and generate pressure maps either over time or consolidating the data into max, min or mean.

The method or the system of some embodiments of the invention may also analyze the stresses or strains in the electronic circuit design features by modeling or analyzing the electric field to which the electronic circuit design features are subject. In some embodiments, the method or the system determines the electric field to which an electronic circuit design feature is subject and then determines the stresses or strains in the electronic circuit design feature caused by the variation of the electric field. In one embodiment, the method or the system first determines the voltage drop across a dielectric feature and then analyzes the electric stress in the dielectric feature. In another embodiment, the method or the system further comprises a model depicting the relationship between the voltage drop across a dielectric material and the stresses or strains so induced to determine the stresses or strains in such dielectric features.

The method or the system of some embodiments of the invention may also more accurately determine the oxide tunneling leakage current. In one embodiment of the present invention, the method or the system may first determine the geometric characteristics of an electronic circuit design feature and then accurately determines the tunneling leakage current based upon such geometric characteristics of the electronic circuit design feature. In another embodiment of the present invention, the method or the system may also further the determination of the tunneling leakage current on a model depicting the relationship between the tunneling leakage current and one or more geometric characteristics (e.g., thickness) of the electronic circuit design feature. For example, the model may comprise a base value for oxide tunneling leakage current at a set of given conditions and deviation of the oxide tunneling leakage current from that base value at different conditions.

The method or the system of some embodiments of the invention may also analyze the electronic circuit design based upon the type of current flow (e.g., DC, pulse-DC AC, or RF) or the direction of the current flow through the electronic circuit design features. In some embodiments of the invention, the method or the system may determine the sizes, locations, or number of vias or interconnections, to be incorporated in a particular region of the electronic circuit design based upon the direction of the current flow and the type of the current flow. In one embodiment, the method or the system determines the number of vias or interconnections in a particular region of the electronic circuit to avoid having one single via or interconnection carrying high DC current in the downstream direction. In another embodiment of the present invention, the method or the system may also determine the stresses or strains of an electronic circuit design feature based upon electron or hole mobility. In another embodiment of the present invention, the method or the system may also determine the stresses or strains of an electronic circuit design feature further based upon the electron or hole mobility, the direction of the electron or hole movement, and mass or momentum transfer within the electronic circuit design feature due to the hole or electron flow.

At 108, the method or the system of some embodiments of the present invention predicts one or more objectives or constraints by using some or all of the stress or strain analysis results.

The one or more objectives or constraints may comprise a requirement for the performance, manufacturability, or reliability (PMR) of the electronic circuit or its individual design features. The performance objectives or constraints may comprise, for example but shall not be limited to, timing, clock frequencies, noise, IR drop, or power consumption. The manufacturability objectives or constraints may comprise, for example but shall not be limited to, the manufacturability of an individual feature of the electronic circuit, of a level of the electronic circuit, or of the entire electronic circuit. Such manufacturability objectives or constraints may also comprise, for example, but shall not be limited to yield optimization or minimization of yield losses, spacing or width of the wires, sizing or placement of redundant or fault tolerant vias and the associated issues of possibly more shorts due to the presence of the redundant vias or fault tolerant vias, lithographic compensations or resolution enhancement techniques, the total number of components or features in an electronic circuit, whether or not some materials, components, features, or modules may be used in place of some other components or features, difficulty or ease of fixturing in the manufacturing of all or part of the electronic circuit, whether the manufacturing of all or part of the electronic circuit requires additional processing (such as an additional surface finish requirement), ease or difficulty of assembly, or simply the sizes of the electronic circuits.

The reliability objectives or constraints may comprise, for example but shall not be limited to, degradation, deterioration, or life of an individual feature, a module, a sub-circuit, or a layer of the electronic circuit or the entire electronic circuit, electromigration, mean time to failure (MTTF), packaging related reliability objectives or constraints, the substrate and parasitic devices in an electro-static discharge protection circuit, or mean time between failure (MTBF), etc. Various mathematical, empirical, or heuristic methods to model the performance, manufacturability, or reliability objectives or constraints of electronic circuit are known to one skilled in the art and will not be reproduced here in greater details. For example, one may opt to the Black's equation in determining MTTF in conjunction with the method(s) or system(s) described herein.

Figure 3:
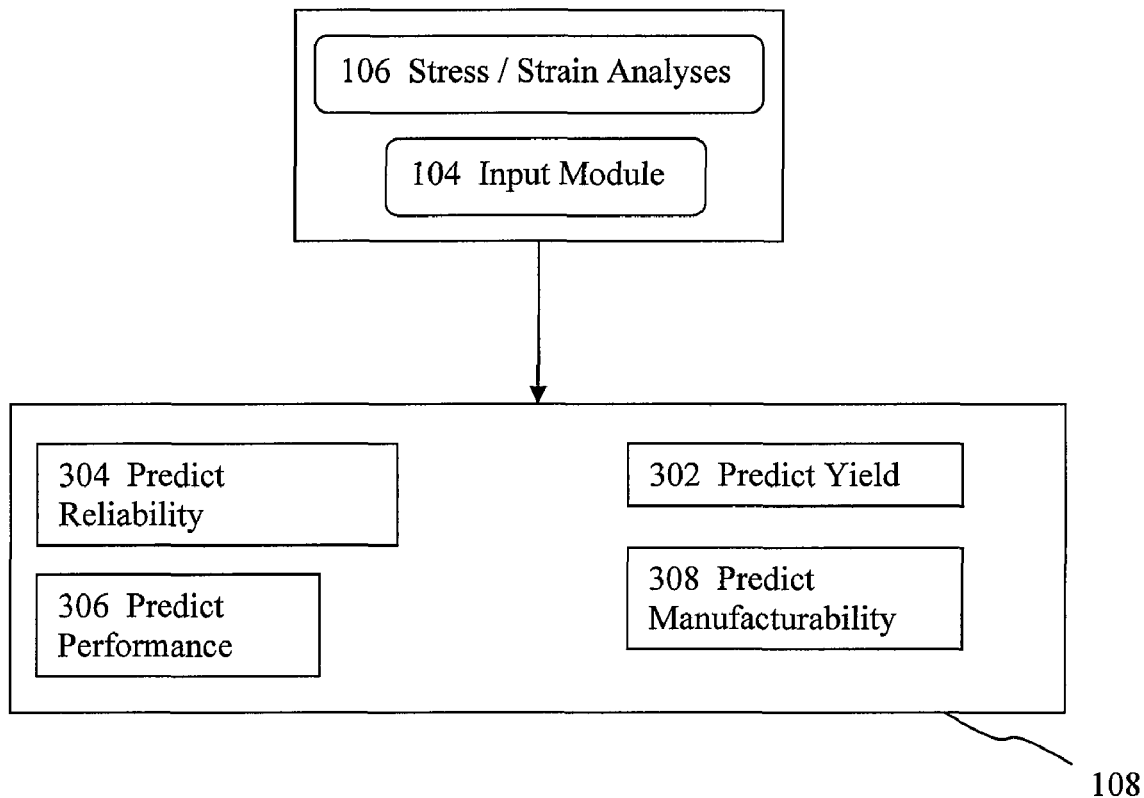
FIG. 3 illustrates an example of the Objective Prediction Module in the method for predicting thin film integrity due to in-film stresses and strains.

FIG. 3 illustrates several embodiments of the objective prediction module, 108, which receives input from the stress/strain analysis, 106, or the input module, 104. One embodiment, 302, of the objective or constraint prediction module, 108, predicts yield of the design based upon some or all of the input into the objective or constraint prediction module. Another embodiment, 304, of the objective or constraint prediction module, 108, predicts reliability of the design based upon some or all of the input into the objective or constraint prediction module. Another embodiment, 306, of the objective or constraints prediction module, 108, predicts performance of the design based upon some or all of the input into the objective or constraint prediction module. Another embodiment, 308, of the objective or constraint prediction module, 108, predicts manufacturability of the design based upon some or all of the input into the objective or constraint prediction module.

Referring back to FIG. 1, the method then proceeds to 110 to determine whether the predicted objectives meet one or more criteria. The one or more criteria may be imposed in the form of design objectives or design constraints. If the predicted objectives meet the criteria the method proceeds to 114 to determine whether there is more interconnect level, layer, or an additional portion of the electronic circuit in the design which require similar analysis. If there is more interconnect level, layer, or additional portion of the electronic circuit some embodiments of the invention repeat 102 through 114 until no more interconnect level, layer, or an additional portion of the electronic circuit requires further analysis or design. If there is no more interconnect level or layers of the electronic circuit in the electronic circuit design some embodiments of the invention proceed to 116 for either tape-out or further physical verification or design rule checking. It shall be noted that a design constraint is a design target that must be met in order for the design to function as designed. For example, an IC may be required to operate at or above a clock frequency or within a band of frequencies. Such a clock frequency requirement may be considered a constraint. On the other hand, a design objective is a design goal which, even if not met, would not cause the IC product to fail or to function improperly. Rather, a design objective is one that more or higher is better. For example, a yield requirement may be considered a design objective as failure to meet the yield requirement would not cause the IC to fail or to function improperly, and the higher the yield the better the profitability will be.

On the other hand, if one or more of the predicted objectives do not meet one or more criteria, some embodiments of the invention employ a correction module 112. The correction module 112 will be described in more details in the immediately following sections.

Figure 4:
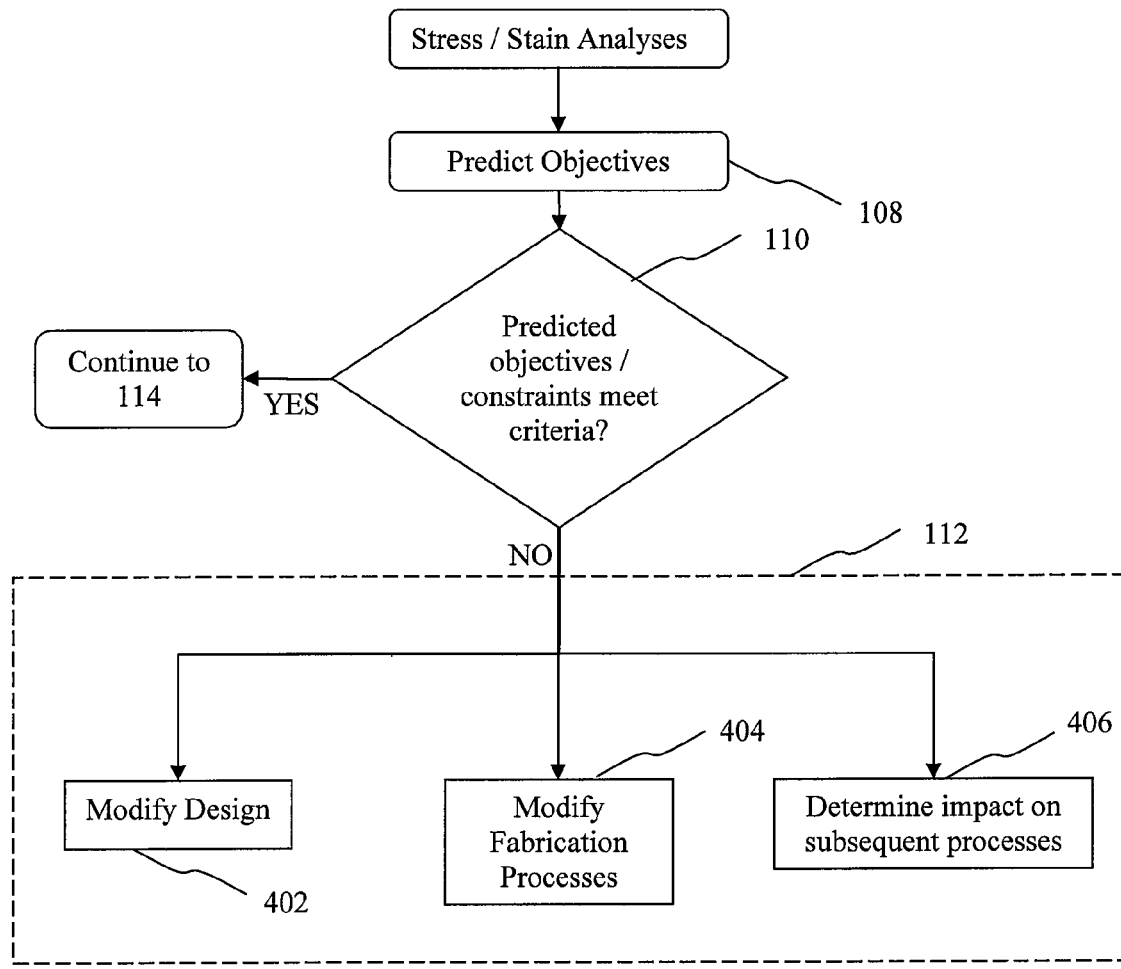
FIG. 4 illustrates an example of a method employing the Correction Module.

FIG. 4 illustrates several embodiments of the Correction Module 112. Some embodiments, 402, modify the electronic circuit designs where the predicted objectives fail to meet one or more criteria. Some other embodiments, 404, modify the manufacturing processes where the predicted objectives fail to meet one or more criteria. In some other embodiments of the present invention, the method or the system may determine to modify both the electronic circuit designs and the manufacturing processes. The determination of modification may be based upon, for example, for example but shall not be limited to, a design goal, objective, or constraint such as some cost or performance criteria. As described above, the manufacturing processes may comprise fabrication, metrology, or image processing processes or techniques involved in the manufacturing of the electronic circuits. Some other embodiments, 406, further analyzes the impact on subsequent manufacturing of the circuits based in part upon the stress/strain analyses, the information and data from the Input Module, or the predicted objectives.

Figure 5:
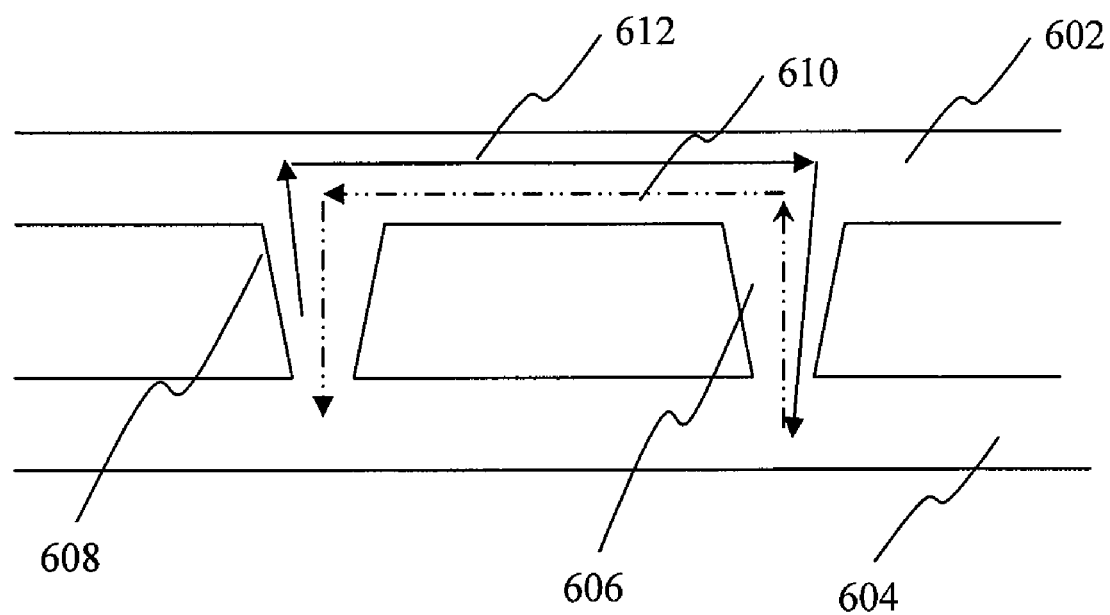
FIG. 5 illustrates an example of electric stress due to electro-migration within vias connecting multiple interconnect levels.

FIG. 5 depicts, for illustrative purposes, a simplified example of a cathode via, 608, and an anode via, 606, both connecting a first metal layer, 602, and a second metal layer, 604. The electrons flow in the direction 610, and the current flows in the opposite direction 612. As a result of carrier transport, the cathode via, 608, exhibits tensile stress state, and the anode via, 606, exhibits a compressive stress state. Moreover, the current flows "upstream" in anode via, 606, and "downstream" in cathode via, 608, and thus the stresses in cathode via, 608, are more likely to cause damages not only because of the direction of current flow but also because of the tensile stress state.

Figure 6:
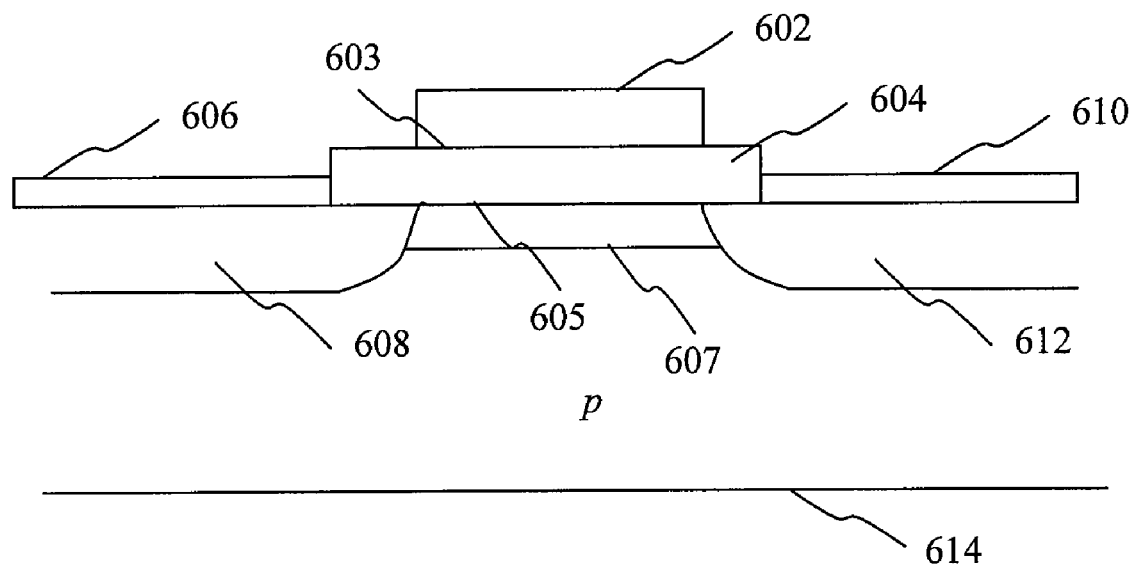
FIG. 6 illustrates an example of electric stress within a gate oxide of an n-channel MOSFET due to electric field across the gate oxide as a result of potential difference across the gate oxide.

FIG. 6 depicts, for illustrative purposes, a simplified example of an n-channel MOSFET on a substrate 614. 602 represents the gate which may be made of, for example, polysilicon. 604 represents the gate oxide which may be made of some low-k dielectric material. 606 represents the source, and 610 represents the drain with both 608 and 612 representing $n^+$. 607 represents the channel. Electric stresses developed across the gate oxide 602 as surfaces 603 and 605 exhibit different potential. Such a potential difference across the gate oxide, 604, may be caused by a plasma, an applied working voltage, current leakage, or a voltage overshoot due to switching. Such stresses consume the life of the gate oxide, 604, and may thus adversely affect the chip's reliability, manufacturability, or performance. Some embodiments of the invention predict stresses in the gate oxide, the source-drain regions, as well as other features of the IC design and use such predictions to avoid the reliability, manufacturability, or performance problems.

Figure 7:
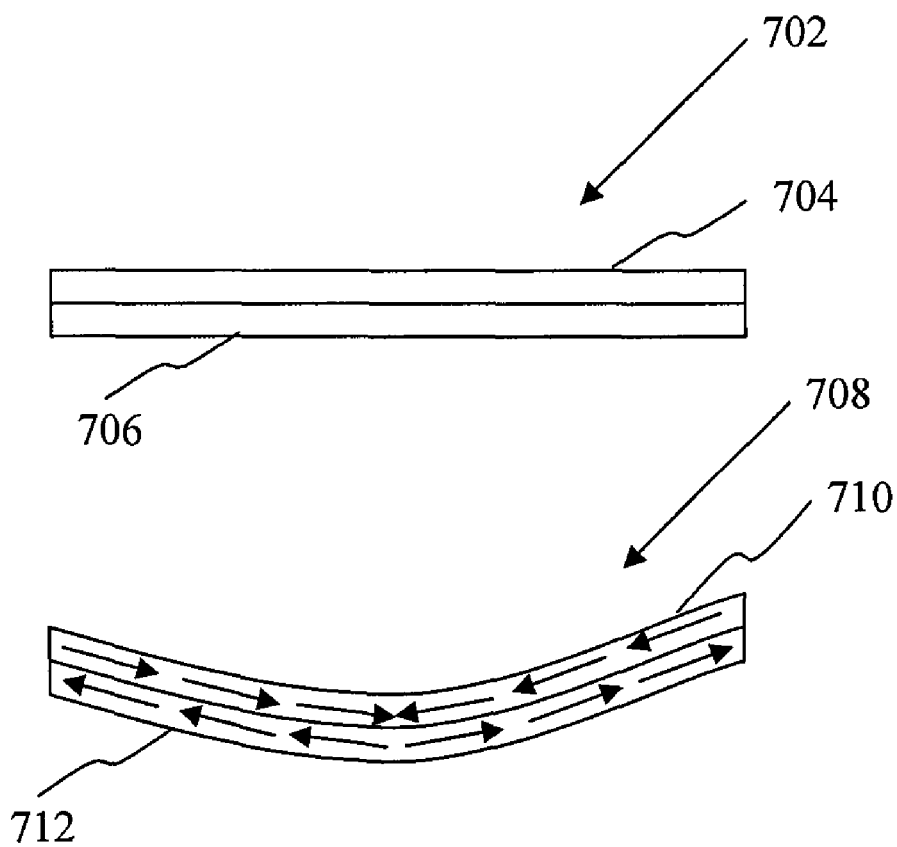
FIG. 7 illustrates an example of mechanical stress due to thermal expansion mismatch between two materials.

FIG. 7 depicts, for illustrative purposes, a simplified example of mechanical stresses due to thermal expansion mismatch. At state 702, the first material 704 with a first thermal expansion coefficient (not shown) is produced on top of the second material 706 with a second thermal expansion coefficient (not shown). For illustrative purpose, we assume the first thermal expansion coefficient of the first material, 704, is smaller than the second thermal expansion coefficient of the second material, 706. At state 708 at some elevated temperature, the first and second materials undergo different degrees of thermal expansion which is proportional to the product of the respective thermal expansion coefficient and the temperature differential between state 702 and state 704. As a result of the different thermal expansion coefficients, the stack of the first, 710, and second material, 712, at state 2 forms a concave shape and thus creates tensile stress within the second material, 712, and compressive stress within the first material, 701. Such stresses may cause the properties, characteristics, or attributes of the feature to drift or even cause the feature to fail prematurely and may also pose reliability, manufacturability, or performance problems with the electronic circuit design. Some embodiments of the invention predict such stresses or strains and use such predictions to avoid the reliability, manufacturability, or performance problems.

Figure 8:
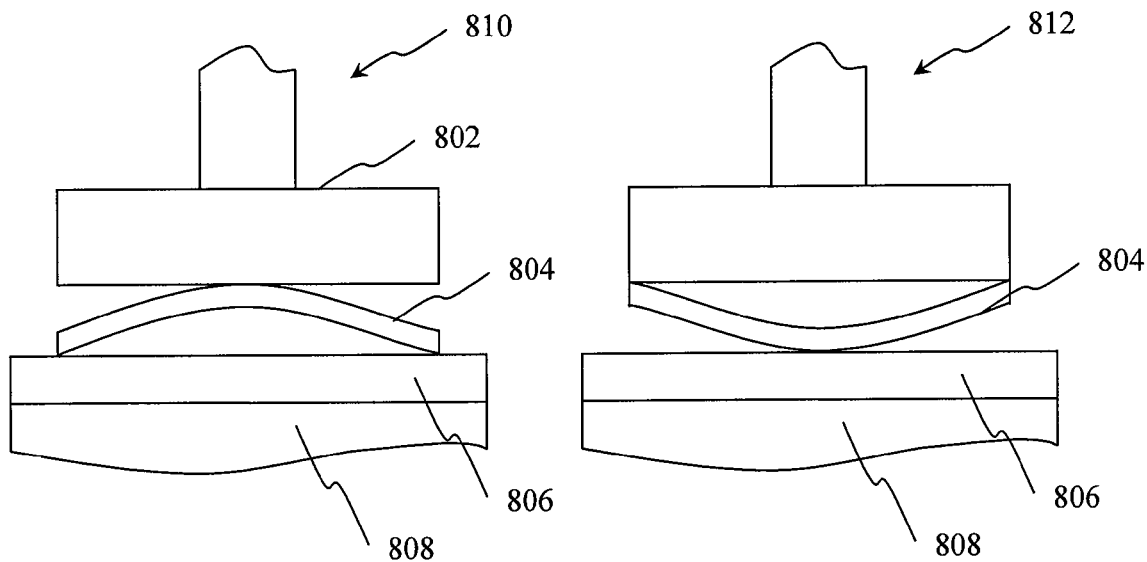
FIG. 8 illustrates an example of the impact on planarization process due to wafer curvature as a result of in-film stresses.

FIG. 8 illustrates the impact of stresses on planarity. FIG. 8 depicts, for illustration purposes, a simplified example of the chemical-mechanical polishing apparatus with the wafer 804 be position between the wafer carrier including the polishing head, 802, and the polishing pad, 806. The polishing pad, 806, is positioned atop the platen, 808, which may be rotating. The resultant in-film stress, however, may cause the wafer, 804, to bow upwards as shown in 810 where the resultant in-film stress is compressive or may cause the wafer, 804, to bend downwards as shown in 812 where the in-film resultant stress is tensile. For example, when the resultant in-film stress is compressive, the wafer may bend upwards as in 801. Since the chemical-mechanical polishing is usually optimized to remove high points on the film, both 801 and 812 may adversely affect the planarity of the global polishing by the CMP apparatus. Some embodiments of the invention predict such stresses and wafer bowing and use such predictions to avoid the reliability, manufacturability, or performance problems.

Some embodiments translate the information about the process models and/or the design elements into a separate set of requirements without unnecessarily disclosing such process models and/or the design elements to third parties. These methods are particularly useful in protecting the ownership of intellectual property and rights therein. For example, the semiconductor Fabs may not wish to disclose such information to IC design houses; the processing equipment manufacturers may not wish to disclose the true capabilities of their processing equipment to other parties; and IP core owners may wish to grant only the right to use without disclosing the details of such IP cores to the licensees or users.

Some other embodiments further obtain the information about the fabricated features of the design and use such information to further calibrate the process models as well as the modifications to the design itself or the fabrication processes so as to improve the accuracy and effectiveness of the above methods.

Some other embodiments further utilize systems utilizing parallel computing architecture to achieve the purpose. Some other embodiments also store the three-dimensional wire/feature profile in a data structure or a database for subsequent retrieval as well as use.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Various embodiments described herein can be used for any type of design activities, including hardware design, software design, and designs including both hardware and software such as hardware/software co-design activities. For example, some embodiments of the invention can be applied to the design of embedded software and systems.

System Architecture Overview

Figure 9:
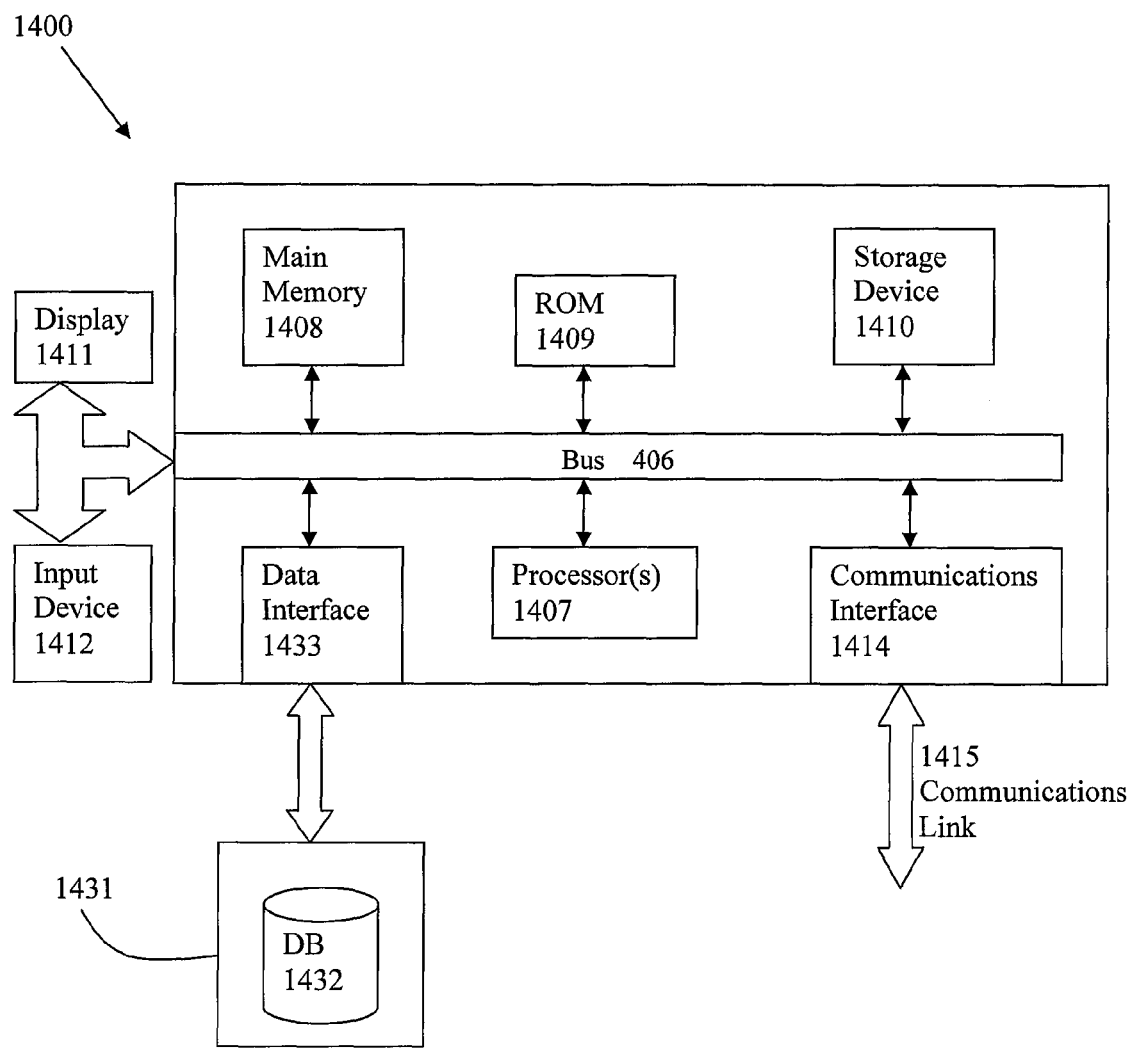
FIG. 9 depicts a computerized system on which a method for timing closure with concurrent process models can be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may also interact with a database system 1432 via a data interface 1433 where the computer system 1400 may store and retrieve information or data of the electronic design into and from the database system.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A machine implemented method for improving integrity of an electronic circuit based upon an analysis of stresses or strains in the electronic circuit, comprising:
   using a computer which comprises at least one processor and is programmed for:
   identifying a first portion of an electronic circuit design and a first concurrent model for a first manufacturing process of the electronic circuit, in which the first portion comprises a first feature;
   identifying a first input information relating to the first portion of the electronic circuit;
   analyzing stress or strain within the first feature of the electronic circuit design to determine whether the first feature, a part of the first feature, or a part of the electronic circuit design including the first feature is in a state that comprises a tensile state based at least in part upon the first concurrent model or the first portion of the electronic circuit design;
   determining whether a first requirement for performance, manufacturability, or reliability is satisfied based at least in part upon a result of the act of analyzing the stress or the strain within the first feature; and
   displaying the electronic circuit design on a display apparatus or storing the first electronic circuit design in a tangible machine accessible medium.

2. The machine implemented method of claim 1, further comprising:
   identifying a second portion of the electronic circuit design and a second concurrent model for a second manufacturing process of the electronic circuit, in which the second portion comprises a second feature.

3. The machine implemented method of claim 2, further comprising:
   identifying the second input information relating to the second portion of the electronic circuit;
   analyzing stress or strain within the second feature of the electronic circuit design;
   determining whether the electronic circuit satisfies a second requirement for performance, manufacturability, or reliability; and
   invoking a correction process where the second feature is determined not to satisfy the second requirement.

4. The machine implemented method of claim 3, in which the determining whether the electronic circuit satisfies the second requirement is based upon a first result of the analyzing stress or strain within the first feature and a second result of the analyzing stress or strain within the second feature.

5. The machine implemented method of claim 3, in which the first or the second manufacturing process comprises a fabrication, metrology, or image processing process or technique.

6. The machine implemented method of claim 5, in which the physical parameter comprises a geometric characteristic of all or part of the first feature, composition of materials of the first feature, concentration of species in the first feature, distribution of the species within the first feature, thermal expansion coefficient, thermal conductivity, temperature distribution, temperature variation before, at, or after the manufacturing process, convectivity of process species in a processing environment, or specific heat capacity.

7. The machine implemented method of claim 3, in which the first or the second concurrent model is calibrated with information obtained from a patterned test wafer or from other source of limited fidelity.

8. The machine implemented method of claim 1, the first feature being a stack of a plurality of films.

9. The machine implemented method of claim 1, in which the first input information comprises part or all of the electronic circuit design, a physical parameter of the first feature, an electrical parameter of the first feature, or an operational parameter.

10. The machine implemented method of claim 9, in which the electrical parameter, the physical parameter, or the operational parameter is obtained by analyzing the electronic circuit design based upon the first concurrent model.

11. The machine implemented method of claim 9, in which the operational parameter comprises a clock frequency, an operational voltage, power distribution or variation, a mechanism or materials of device packaging for the electronic circuit, a heat transfer mechanism of the electronic circuit during operation, or a characteristic of the manufacturing process.

12. The machine implemented method of claim 9, in which the electrical parameter comprises bulk or specific electrical resistance, capacitance, IR drop, RC time constant, dielectric strength, electrical conductivity, electron or hole mobility, diffusivity, carrier concentration, electromagnetic field, or timing delay information.

13. The machine implemented method of claim 1, in which the analyzing stress or strain within the first feature is based upon a geometric characteristic of the first feature and comprises:
    determining a state or a magnitude of the stress or the strain within the first feature; and
    determining an impact of the stress or the strain upon performance, reliability, or manufacturability of the electronic circuit or of a subsequent manufacturing process.

14. The machine implemented method of claim 13, further comprising:
    determining a size, location, or number of a via or an interconnect based upon the stress or the strain within the first feature.

15. The machine implemented method of claim 1, in which the stress comprises:
    electric stress caused by electric field, voltage differential across the first feature, voltage overshoot during device switching, plasma induced voltage differential, applied working voltage, Joule heating, direction, type, or magnitude of current flow, carrier transport, momentum or mass transfer due to carrier or electron transport, or
    mechanical stresses caused by a characteristic of the manufacturing process, a property for a material of the first feature, a duration of the manufacturing process or between two manufacturing process steps.

16. The machine implemented method of claim 1, further comprising:
    invoking a correction process where the first feature is determined not to satisfy the first requirement.

17. The machine implemented method of claim 16, in which the correction process comprises an act of:
    modifying the electronic circuit design or the manufacturing process upon which the concurrent model is determined, where the first feature is determined not to satisfy the first requirement.

18. The machine implemented method of claim 1, in which the determining whether the first feature satisfies a first requirement is based upon the first concurrent model, a result of the analyzing stress or strain, or a failure model for the first feature.

19. The machine implemented method of claim 1, in which the performance objective or constraint comprises a timing, clock frequency, noise, IR drop, or power consumption requirement.

20. The machine implemented method of claim 1, in which the manufacturability objective or constraint comprises manufacturability of an individual feature of the electronic circuit, of a part or all of the electronic circuit, yield optimization or minimization of yield losses, spacing or width of conductors, sizes or placement of redundant or fault tolerant vias, associated issue of more shorts due to presence of the redundant or fault tolerant vias, lithographic compensations or resolution enhancement techniques, total number of components or features in the electronic circuit, whether or not some materials, components, features, or modules of the electronic circuit may be used in place of some other components or features, ease or difficulty of fixturing during manufacturing of all or part of the electronic circuit, whether manufacturing of all or part of the electronic circuit requires additional processing, ease or difficulty of assembly, or size of the electronic circuit.

21. The machine implemented method of claim 1, in which the reliability objective or constraint comprising degradation, deterioration, or life of a part or all of the electronic circuit, electromigration, mean time to failure (MTTF), reliability objective or constraint related to device packaging reliability, a substrate and parasitic devices in an electro-static discharge protection circuit, or mean time between failure (MTBF).

22. The machine implemented method of claim 1, in which a part of the electronic circuit design is generated by a context simulation method.

23. The machine-implemented method of claim 1, further comprising:
    combining the first concurrent model with statistical variability measured from or produced by an additional model for the first portion to produce a distribution of values related to the first feature.

24. A system for improving integrity of an electronic circuit based upon an analysis of stresses or strains in the electronic circuit, comprising:
    a computer which comprises at least a processor and is programmed for performing:
    identifying a first portion of an electronic circuit design for a first feature of an electronic circuit, in which the first portion comprises a first feature;
    identifying a first input information relating to the first feature of the electronic circuit;
    analyzing stress or strain within the first feature of the electronic circuit design to determine whether the first feature, a part of the first feature, or a part of the electronic circuit design including the first feature is in a state that comprises a tensile state based at least in part upon the first concurrent model or the first portion of the electronic circuit design;

determining whether the first feature satisfies a first requirement for performance, manufacturability, or reliability is satisfied based at least in part upon a result of the act of analyzing the stress or the strain within the first feature; and a display apparatus configured for displaying the first electronic circuit design or a computer readable storage medium or a computer storage device configured for storing the first electronic circuit design.

25. The system of claim 24, wherein the computer is further programmed for performing:

identifying the second input information relating to the second portion of the electronic circuit;

analyzing stress or strain within the second feature of the electronic circuit design;

determining whether the electronic circuit satisfies a second requirement for performance, manufacturability, or reliability; and invoking a correction process where the second feature is determined not to satisfy the second requirement.

26. The system of claim 24, wherein the computer is further programmed for performing:

determining a state or a magnitude of the stress or the strain within the first feature; and determining an impact of the stress or the strain upon performance, reliability, or manufacturability of the electronic circuit or of a subsequent manufacturing process.

27. The system of claim 24, wherein the computer is further programmed for performing:

invoking a correction process where the first feature is determined not to satisfy the first requirement.

28. A computer program product comprising a computer-usable storage medium having executable code to execute a process for improving integrity of an electronic circuit based upon an analysis of stresses or strains in the electronic circuit, the process comprising:

identifying a first portion of an electronic circuit design for a first feature of an electronic circuit;

identifying a first input information relating to the first feature of the electronic circuit;

analyzing stress or strain within the first feature of the electronic circuit design to determine whether the first feature, a part of the first feature, or a part of the electronic circuit design including the first feature is in a state that comprises a tensile state based at least in part upon the first concurrent model or the first portion of the electronic circuit design;

determining whether the first feature satisfies a first requirement for performance, manufacturability, or reliability is satisfied based at least in part upon a result of the act of analyzing the stress or the strain within the first feature; and displaying the first electronic circuit design or storing the first electronic circuit design in a tangible machine accessible medium.

29. The computer program product of claim 28, the process further comprising:

identifying the second input information relating to the second portion of the electronic circuit;

analyzing stress or strain within the second feature of the electronic circuit design;

determining whether the electronic circuit satisfies a second requirement for performance, manufacturability, or reliability; and invoking a correction process where the second feature is determined not to satisfy the second requirement.

30. The computer program product of claim 28, the process further comprising:

determining a state or a magnitude of the stress or the strain within the first feature; and determining an impact of the stress or the strain upon performance, reliability, or manufacturability of the electronic circuit or of a subsequent manufacturing process.

31. The computer program product of claim 28, the process further comprising:

invoking a correction process where the first feature is determined not to satisfy the first requirement.

* * * * *